Jan. 14, 1964  NAOYUKI OHARA  3,117,503
EXPOSURE-METER-COUPLED SHUTTER
Filed Oct. 3, 1960  4 Sheets-Sheet 2

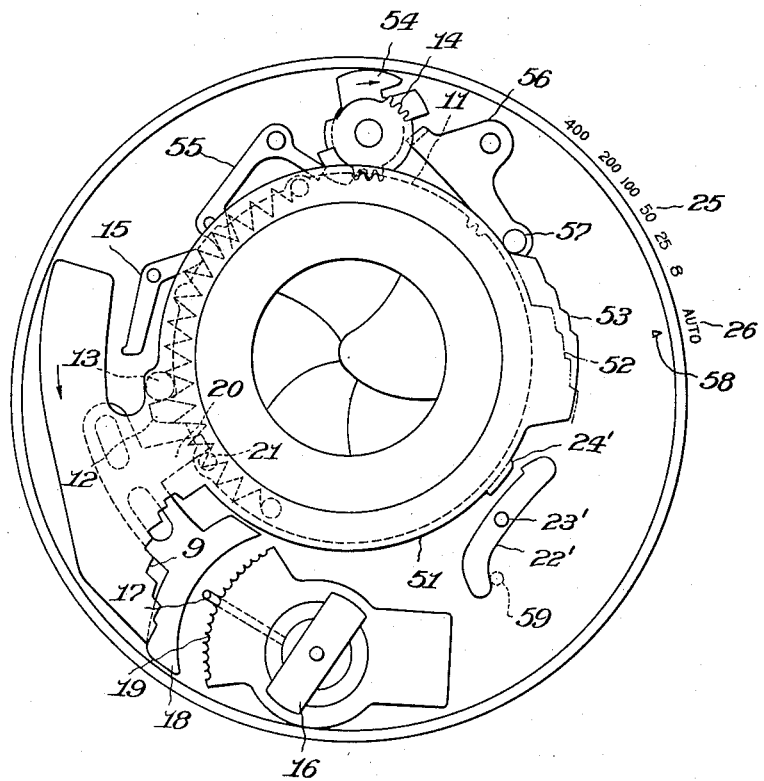

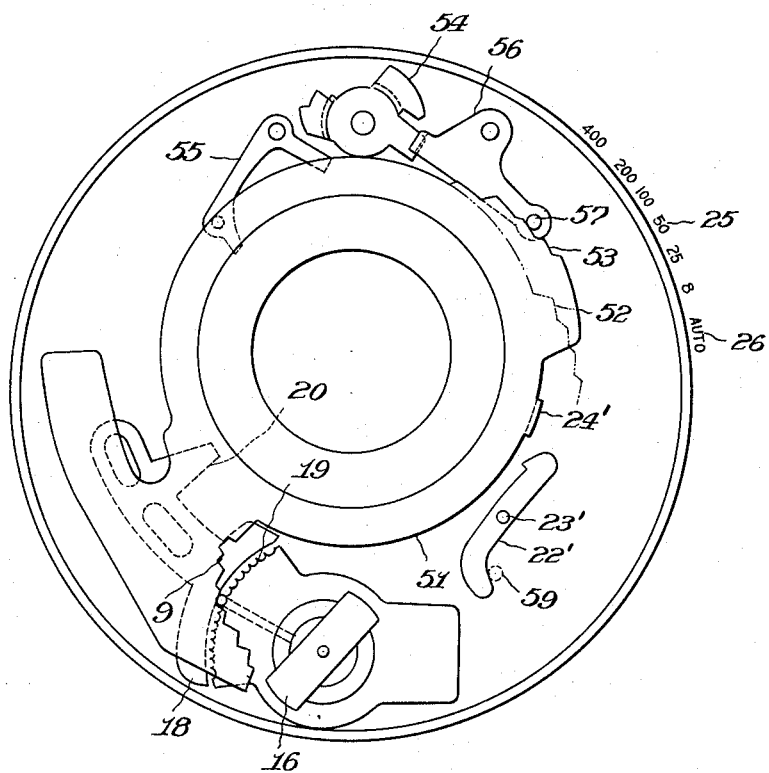

United States Patent Office
3,117,503
Patented Jan. 14, 1964

1

3,117,503
EXPOSURE-METER-COUPLED SHUTTER
Naoyuki Ohara, 436 1-chome, Soshigaya, Setagaya-ku, Tokyo-to, Japan
Filed Oct. 3, 1960, Ser. No. 60,062
Claims priority, application Japan Oct. 8, 1959
2 Claims. (Cl. 95—10)

This invention relates to shutters of photographic cameras, and more particularly it relates to a new and improved shutter system wherein a built-in exposure meter is coupled to and may be caused to control the exposure value of the shutter in an automatic manner so as to produce the appropriate exposure.

It is another object of this invention to provide a shutter system as stated above which further has a selecting means for mechanically selecting the shutter system from the automatic operation state to a manual operation state, whereby the diaphragm aperture and shutter speed may be manually selected at will.

The method of permitting the pointer of an exposure meter to swing freely, during cocked state of the shutter, to indicate the exposure at the time; utilizing the shutter releasing action to hold the said pointer of the exposure meter in the indicating position and utilizing the said pointer as a limiting stop; and automatically moving the exposure value adjusting member up to the limit position imposed by the said pointer used as a limiting stop so as to obtain the required diaphragm aperture and shutter speed for appropriate exposure is known in the art. In the present invention the lens shutter is provided with an exposure meter built into the shutter system and coupled with the diaphragm mechanism or the shutter speed adjusting mechanism so as to enable automatic selection of appropriate exposures. Furthermore, not only is automatic coupling possible, but manual selection of diaphragm aperture or shutter speed is also made possible by the installation of a selecting device for selecting from "Automatic Operation" to "Manual Operation."

The details of the invention and the manner in which the aforestated objects as well as other objects and advantages may best be achieved will be understood more fully from a consideration of the following description, taken in conjunction with the accompanying illustrations, in which the same or equivalent parts are designated by the same reference numerals, in which FIGS. 1 through 3 illustrate a representative embodiment of the shutter of the invention wherein an exposure meter and a diaphragm aperture adjusting member are coupled, and FIGS. 4 and 5 illustrate another representative embodiment wherein an exposure meter and a shutter speed adjusting member are coupled, and in which:

FIG. 4 is a frontal elevational view of an embodiment wherein an exposure meter is coupled to a shutter speed adjusting mechanism and corresponds to the state shown in FIG. 1; and FIG. 5 is an elevational view of the shutter shown in FIG. 4 and corresponds to the state shown in FIG. 2.

Figure 1:
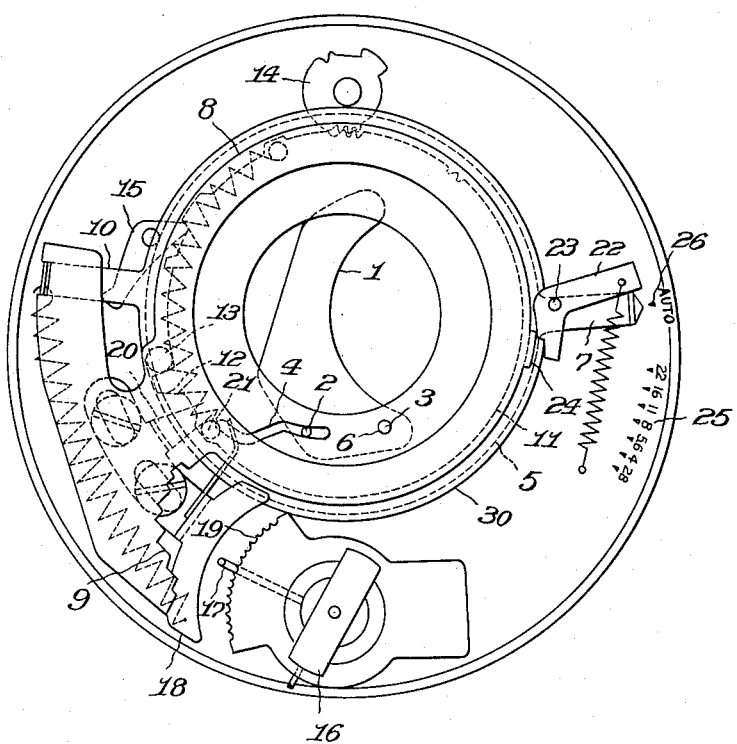
FIG. 1 is a frontal elevational view in the direction of the optical axis, showing the shutter in the cocked state.
Figure 2:
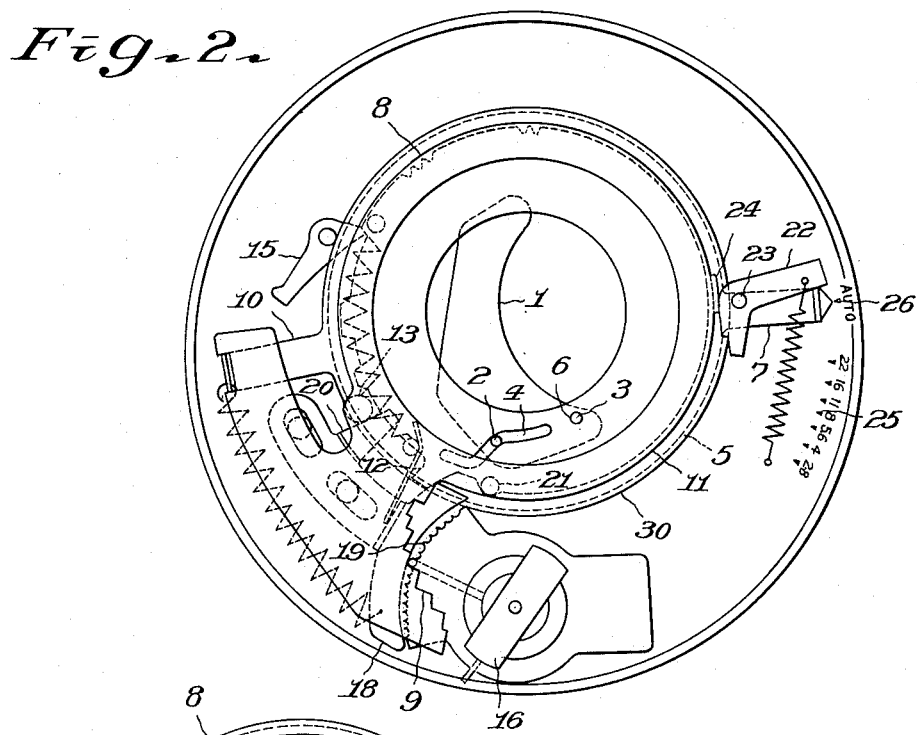
FIG. 2 is a frontal elevational view showing the same shutter as in FIG. 1 after shutter release, with the diaphragm (represented by only one diaphragm blade) maintained in the state of required aperture.
Figure 3:
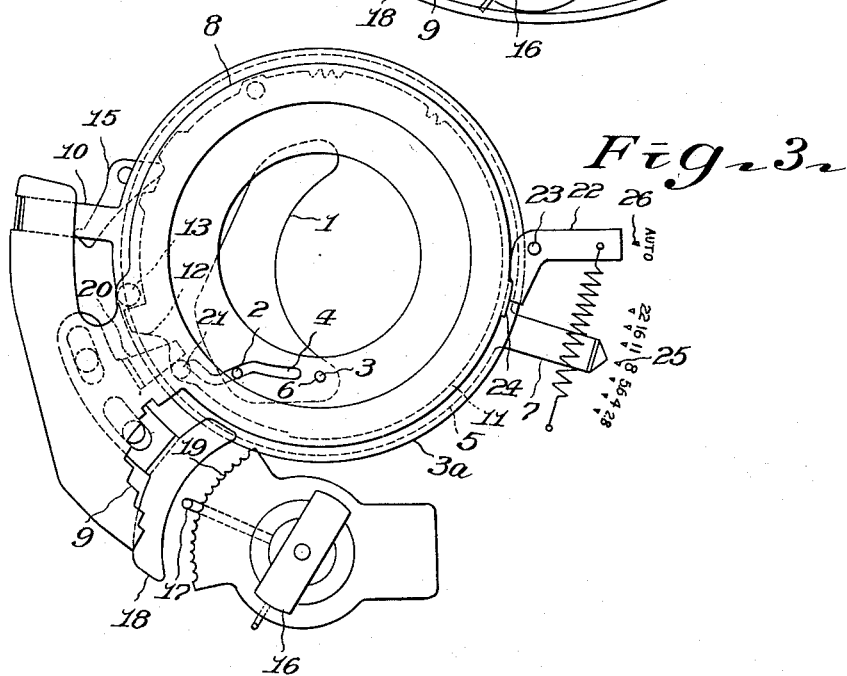
FIG. 3 is a frontal elevational view similar to FIGS. 1 and 2, showing the shutter in the state wherein, by actuating a selecting device, manual selection of the diaphragm aperture is possible.

Referring initially to FIGS. 1 through 3, the diaphragm aperture is determined by the dispositions of the diaphragm blades, only one representative diaphragm blade 1 being shown. Each diaphragm blade 1 has pins 2 and 3

2 protruding from opposite sides thereof, one of said pins, 2, being engaged in a diaphragm blade actuating slot 4 formed in an automatic diaphragm actuating plate 30, and the other of said pins, 3, being fitted rotatably in a circular hole 6 formed in a manual diaphragm adjusting plate 5.

As an alternative arrangement, the diaphragm blade actuating slot 4 and the circular hole 6 may be provided on respectively opposite positions, the said circular hole being provided in the diaphragm actuating plate 30, and the said slot being provided in the diaphragm adjusting plate 5 on the other side.

A manipulating piece 7 is fixed to the manual diaphragm adjusting plate 5 and functions both as a diaphragm aperture indicator and as a switching lever handle for automatic and manual operation. In FIG. 1, this piece 7 is shown as indicating the "Auto" position, which means automatic exposure adjustment of the diaphragm.

An automatic exposure control member 8, which is engaged by a spring which constantly exerts thereon a force tending to rotate the said member 8 in the counterclockwise direction, is coupled through a protruding arm 10 to the automatic diaphragm actuating plate 30, with which it is adapted to move integrally as a single body. The said member 8 has, at one portion thereof, a protruding arm on which a stepped cam 9 is provided. A pin 13 which is rigidly fixed to the automatic exposure control member 8 is engageable with a protrusion 12 provided on the outer periphery of a cocking member 11, on which a spring constantly exerts a force in the direction of counterclockwise rotation. A cocking gear 14 is enmeshed with the gear-toothed portion of the cocking member 11 and has the function of cocking or charging the shutter blade opening and closing device. The rotation of the cocking member 11 is arrested or released by a cocking member pawl 15.

An exposure meter 16 is installed within the shutter case, which may be disposed eccentrically relative to the optical axis as necessary, and has an indicating pointer 17. The said pointer 17 may be held as necessary in any indicated position thereof by a clamping member 18 operating in conjunction with a cogged arrester 19. A protruding tooth 20 on the clamping member 18 is engageable with a pin 21 fixed to the cocking member 11. A spring exerts a force constantly on the clamping member 18 in the counterclockwise direction. The cogged arrester 19 is provided with several serrations in order to hold the pointer 17 positively.

A selecting lever 22, which is pivoted on a shaft 23, and on which is exerted a clockwise force by a spring, is disposed in the vicinity of the outer periphery of the manual diaphragm actuating plate 5. One end of the said lever 22 is engageable with the manipulating piece 7 of the said diaphragm adjusting plate 5, and the other end is in the form of a pawl which is capable of engaging a protrusion 24 on the outer periphery of the automatic exposure control member 8. A diaphragm aperture scale 25 for manual selection and an indicator 26 for automatic diaphragm mechanism when the diaphragm of the shutter and the exposure meter are so coupled, are so disposed that both may indicate in cooperation with the manipulating piece 7.

The operation of the shutter of the above-described construction may be best understood from the following description taken in conjunction with FIGS. 1 through 3. FIG. 1 shows the state of the various essential parts of the shutter after the shutter has been cocked by the cocking member 11; the manipulating piece 7, that is, the manual diaphragm actuating plate 5, has been rotated in the counterclockwise direction; the selecting lever 22 has been rotated by the shoulder of the manipulating piece 7 so that its contact portion has separated from the protrusion 24; and, whereby, the automatic exposure control member 8 has been prepared for operation.

When the shutter, in this state, is released, the pawl 15 disengages; the cocking member 11 begins to rotate in the counterclockwise direction; and the engaged relations between the protrusion 12 of the cocking member 11 and the pin 13 of the automatic exposure control member 8 and between the pin 21 and the protruding tooth 20 of the clamping member 18 are disengaged. Consequently, forward-thrusting clamping member 18 clamps the exposure meter pointer 17 and fixes its position in cooperation with the cogged arrester 19. Successively, the stepped cam 9 of the automatic exposure control member 8 contacts the pointer 17 in its fixed state and stops, whereby the magnitude of rotation of the control member 8 is adjusted.

At the same time, the automatic diaphragm actuating plate 30, which is connected to the said control member 8, is also rotated in the counterclockwise direction. As a result, the diaphragm blade 1 is caused to move in the counterclockwise direction with the pin 3 as a pivot and with sliding of the pin 2 on diaphragm plate actuating slot 4 as the point of exertion of force. The resulting diaphragm aperture is adjusted to correspond to the exposure meter indication. Successively, the cocking member 11 releases the shutter blade opening and closing device, and the shutter blades are opened and closed.

The mechanical states of the various parts after the above-described release operation are shown in FIG. 2. With the shutter in this condition, it is possible to cock the shutter again and to use it for automatic exposure control member coupling with exposure meter.

In the embodimnet described above, the construction is such that, when the cocking member 11 is cocked, the diaphragm blades 1 are moved to their minimum aperture positions, then, upon release of the shutter, said blades are automatically adjusted to the required aperture as afore-described. This construction may be modified so that, when the cocking member 11 is cocked, the diaphragm blades 1 are, conversely, maintained in their fully opened state, then, upon release of the shutter, the said blades automatically move in the aperture closing direction and stop at the required aperture.

If the manipulating piece 7, in the condition shown in FIG. 1, is moved from the indicator 26 for automatic operation to the manual diaphragm scale 25, the selecting lever 22 will rotate, and its contact shoulder will catch on the protrusion 24. Accordingly, the automatic exposure control member 8 will be locked; simultaneously, the manual diaphragm actuating plate 5 will move in the clockwise direction; and the diaphragm blades 1, with their pins 3 rotatably fitted in the circular holes 6 in the manual diaphragm actuating plate 5 as the points of force exertion, and with the contact points between their pins 2 and the respective diaphragm blade actuating slot 4, will move in the counterclockwise direction and will be adjusted to the required aperture.

In this case, since the automatic exposure control member 8 is locked, the release of the shutter causes only the cocking member 11 to function and the shutter blades to open and close as afore-described and the automatic exposure control member 8 becomes inoperative. FIG. 3 shows, in an explanatory manner, the operation described above.

Referring now to FIGS. 4 and 5, which illustrate the case wherein an exposure meter and a shutter speed adjusting member are coupled, the embodiment shown has an exposure meter 16 installed within the shutter. Said exposure meter has a pointer 17, which can be fixed by a cogged arrester 19 by the pressing action of a clamping member 18 having exerted thereon an elastic, counterclockwise force. An automatic exposure control member 51 for coupling with an exposure meter, which has a spring constantly exerting thereon a counterclockwise force, is disposed with its center coincident with the optical axis. A stepped cam 9 is provided in a portion of the said automatic exposure control member 51 so as to be engageable with the aforesaid pointer 17, whereby the rotational position of the said automatic exposure control member 51 can be determined and set. The said automatic exposure control member 51 is also provided at another portion thereof with a cam surface 53 for shutter speed controlling. The rotational torque of a master member 54, which has a spring constantly exerting thereon a clockwise force, is transmitted by an actuating lever 56 to a speed control governor (not shown). A pin 57 is provided on the said shutter speed control governor actuating lever 56 in order to control the operating angle of the first gear in the gear train of the said shutter speed control governor. The said pin 57 is engageable with the aforesaid cam surface 53 for speed control.

The rotational torque of the above-mentioned master member 54 can be locked or released by a pawl 55.

A gear-toothed portion of a cocking member 11 is intermeshed with a setting pinion 14, through which the said cocking member 11 cocks or charges the said master member 54.

At another portion of the said cocking member 11, a protrusion 12 is provided so as to be engageable with a pin 13 on the said automatic exposure control member 51. At yet another portion of the said cocking member 11, a pin 21 is fixed so as to be engageable with a protruding tooth 20 on the aforesaid clamping member 18.

A manual shutter speed adjusting member 52 is disposed so as to be separately engageable with the aforesaid pin 57 for adjusting the operating angle of the first gear in the gear train of the shutter speed control governor. A speed indicator 58 operates in conjunction with the said manual shutter speed adjusting member 52 and indicates the shutter speed on a manual time scale 25 or indicates, when it is coincident with an automatic operation 26, the condition wherein the shutter speed is coupled to the exposure meter.

The selecting of the shutter speed control system between automatic operation and manual operation is accomplished by means of a selecting lever 22', which rotates about a shaft 23', and on which a counterclockwise force is exerted by a spring. The pawl tooth on one end of the said selecting lever 22' is engageable with a protrusion 24' on the aforesaid automatic exposure control member 51. A pin 59 which is fixed to the manual shutter speed adjusting member 52 is engageable with the rear end of the selecting lever 22'.

The operation of the shutter of the above-described construction may be best understood from the following description taken in conjunction with FIGS. 4 and 5. FIG. 4 shows the states of the various essential parts of the shutter after the manual shutter speed adjusting member 52 has been retracted so that the indicator 58 of the shutter speed coincides with the marking 26 of the automatic adjustment; consequently, the selecting lever 22' has been pushed by the actuating pin 59 so that its pawl tooth has disengaged from the protrusion 24', thereby releasing the shutter speed adjusting member 51 and placing it in a moveable condition; and the cocking member 11 has cocked the shutter.

When the shutter, in this state, is released, the pawl 15 disengages; the cocking member 11 rotates in the counterclockwise direction; and the engagement relations between the pin 21 and the protruding tooth 20 and between the protrusion 12 and the pin 13 are cut. Consequently, the clamping member 18 and the automatic exposure control member 51 are driven in the counterclockwise direction, whereupon, the clamping member 18 first clamps on and holds the pointer 17, then the stepped cam 9, which moves conjointly with the rotation of the automatic exposure control member 51, comes to a stop against the pointer 17, which is in a fixed state, and determines the stopping position of the automatic exposure control member 51, that is, of the shutter speed adjusting, cam surface 53, whereby the pin 57 of the actuating lever 56 which has moved up to the said position initially adjusts the operating angle of the first gear which is in general a sector gear in the gear train of the shutter speed control governor. Apart from the above-described operation, the cocking member 11 disengages another pawl 55 at a somewhat later instant and actuates the main master member 54, which thereupon fully opens the shutter blades, then pushes the actuating lever 56 and operates the shutter speed control governor at the action angle of its first gear, which has been previously determined by the pin 57, closing the shutter blades at the speed corresponding to the governor resistance to complete the exposure.

FIG. 5 shows the state wherein the shutter blades are completely opened by the shutter release, and the shutter speed control governor is successively about to begin its operation. In conformance with the subsequent movement of the governor, the shutter blades are closed.

If the manual shutter speed setting disk 52 in the position shown in FIG. 4 is turned in the counterclockwise direction, it will contact the speed control pin 57, and the indicator 58 will indicate on the manual time scale 25. Simultaneously, the selecting lever actuating pin 59 will retreat, permitting the pawl tooth of the selecting lever 22' to catch on the protrusion 24', thereby locking the automatic exposure control member 51. Consequently, the shutter is released in this state, the automatic exposure control member 51 will be inactive, and the shutter will operate in accordance with the manual shutter speed control. As will be clear from the above disclosure, diaphragm aperture or shutter speed can be automatically and independently adjusted by means of an enclosed exposure meter and also manual selection of the shutter speed or diaphragm aperture can be freely and surely carried out. However, according to such shutter, only one of the elements for determining the exposure value, that is, aperture value or shutter speed, is automatically adjusted by the brightness of the object to be photographed so that it is only necessary to adjust the other elements manually so that the exposure meter and the mechanism will give a correct exposure value.

According to the present invention, a needle are pointer of the said exposure meter is actuated to the predetermined position corresponding to the light intensity on the photo-cell and clamped by the said clamping member as described above, then the said pointer functions as a member which controls the motion of the said exposure control member for automatic adjustment of the exposure, so that the exposure value can be adjusted corresponding to the light intensity.

This arrangement, therefore, greatly increases the precision of the automatic adjustment of the exposure value, and makes the construction rather simple. Furthermore, by this arrangement, the exposure meter itself is not required to produce a large rotational torque to accomplish the mechanism of the automatic exposure adjustment. Moreover, since the manual adjustment of the exposure such as manual adjustment of the diaphragm aperture or of the shutter speed may also be accomplished, the shutter of this invention has such advantages as a wide scope of use.

While I have described a few particular embodiments of my invention and have proposed a few modifications thereof, it will of course, be understood that I do not wish my invention to be limited to the details described herein, since many further modifications may be made, and I, therefore, contemplate by the appended claims to cover all such modifications as fall within the true spirit and scope of my invention.

What I claim is:

1. In a photographic lens device of the type having an adjustable diaphragm aperture, a device casing and a photoelectric exposure meter installed within said device casing provided with a pointer, said pointer being movable to the various positions corresponding to the light intensity and then utilized as a stop whereby an appropriate diaphragm aperture can be automatically adjusted; a system for coupling the device to an exposure meter which comprises two diaphragm adjusting members for adjusting said diaphragm to different aperture sizes, an automatic exposure control member connected to one of said diaphragm adjusting members provided with a stepped cam which is formed to engage with said pointer of said exposure meter to function as an automatic control member of the diaphragm aperture, and the other of said adjusting members constituting means for selecting one of said two ways of exposure control, automatic or manual operation of the device.

2. In a photographic lens shutter of the type having a device for adjusting the shutter speed, a shutter casing and a photoelectric exposure meter installed within said shutter casing, said exposure meter being provided with a pointer, said pointer being movable to the various positions corresponding to the light intensity and then utilized as a stop whereby the appropriate shutter speed is automatically sensed; a system for coupling the shutter to said exposure meter which comprises an exposure control member provided with both a cam for shutter speed adjustment and a stepped cam which is formed to engage with said pointer of said exposure meter to function as an automatic control member of the shutter speed, and a second selectively usable manual shutter speed adjusting member whereby manual selection of the shutter speed can be had or the selection of the automatic adjustment of the shutter speed can also be accomplished.

References Cited in the file of this patent

UNITED STATES PATENTS

| | | |
|---|---|---|
| 2,868,095 | Gebele | Jan. 13, 1959 |
| 2,925,760 | Broschke | Feb. 23, 1960 |
| 2,969,004 | Gebele | Jan. 24, 1961 |